United States Patent
Buss et al.

(10) Patent No.: US 10,222,804 B2
(45) Date of Patent: Mar. 5, 2019

(54) INERTIAL REFERENCE FOR TBA SPEED LIMITING

(71) Applicant: Ford Global Technologies, LLC, Dearborn, MI (US)

(72) Inventors: Brian George Buss, Ypsilanti, MI (US); Michael Hafner, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/331,492

(22) Filed: Oct. 21, 2016

(65) Prior Publication Data

US 2018/0113465 A1   Apr. 26, 2018

(51) Int. Cl.
| | |
|---|---|
| *G05D 1/02* | (2006.01) |
| *B60W 10/20* | (2006.01) |
| *B60W 10/184* | (2012.01) |
| *B60W 10/04* | (2006.01) |
| *B60W 30/095* | (2012.01) |

(Continued)

(52) U.S. Cl.
CPC ........... *G05D 1/0223* (2013.01); *B60W 10/04* (2013.01); *B60W 10/184* (2013.01); *B60W 10/20* (2013.01); *B60W 30/0953* (2013.01); *B60W 30/146* (2013.01); *B60W 30/18036* (2013.01); *G08G 1/0962* (2013.01); *G08G 1/167* (2013.01); *G08G 1/168* (2013.01); *B60W 2050/0089* (2013.01); *B60W 2520/10* (2013.01); *B60W 2520/14* (2013.01); *B60W 2520/22* (2013.01);

(Continued)

(58) Field of Classification Search
CPC ....... G06F 17/00; G05D 1/0223; B60W 10/04
See application file for complete search history.

(56) References Cited

U.S. PATENT DOCUMENTS

| | | |
|---|---|---|
| 3,542,390 A | 11/1970 | Fikes et al. |
| 3,605,088 A | 9/1971 | Savelli |

(Continued)

FOREIGN PATENT DOCUMENTS

| | | |
|---|---|---|
| CN | 102582686 B | 9/2013 |
| DE | 3923676 A1 | 1/1991 |

(Continued)

OTHER PUBLICATIONS

"Ford Super Duty: Truck Technologies", Brochure, Sep. 2011, 2 pages.

(Continued)

*Primary Examiner* — Alex C Dunn
(74) *Attorney, Agent, or Firm* — Frank MacKenzie; Price Heneveld LLP (57) ABSTRACT

A method of controlling a vehicle while the vehicle is backing up with a trailer attached thereto. The vehicle may include a brake system and a power train system. The method includes determining a trailer yaw rate, and estimating a modified trailer curvature. The modified trailer curvature comprises a ratio of the trailer yaw rate to the vehicle speed. The method further includes determining a maximum allowable vehicle speed as a function of modified trailer curvature utilizing predefined criteria that defines a maximum allowable vehicle speed for a given modified trailer curvature. The method further includes limiting the vehicle speed such that the maximum allowable vehicle speed is not exceeded.

18 Claims, 6 Drawing Sheets

(51) Int. Cl.
*B60W 30/14* (2006.01)
*B60W 30/18* (2012.01)
*G08G 1/0962* (2006.01)
*G08G 1/16* (2006.01)
*B60W 50/00* (2006.01)

(52) U.S. Cl.
CPC ... *B60W 2540/18* (2013.01); *B60W 2710/207* (2013.01)

(56) References Cited

U.S. PATENT DOCUMENTS

| | | |
|---|---|---|
| 3,787,077 A | 1/1974 | Sanders |
| 3,833,928 A | 9/1974 | Gavit et al. |
| 3,860,257 A | 1/1975 | Mesley |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,366,966 A | 1/1983 | Ratsko et al. |
| 4,727,419 A | 2/1988 | Yamada et al. |
| 4,735,432 A | 4/1988 | Brown |
| 4,752,080 A | 6/1988 | Rogers |
| 4,778,060 A | 10/1988 | Wessner, Jr. |
| 4,848,449 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,056,905 A | 10/1991 | Jensen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,191,328 A | 3/1993 | Nelson |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,559,696 A | 9/1996 | Borenstein |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,719,713 A | 2/1998 | Brown |
| 5,747,683 A | 5/1998 | Gerum et al. |
| 5,821,852 A | 10/1998 | Fairchild |
| 5,980,048 A | 11/1999 | Rannells, Jr. et al. |
| 6,041,582 A | 3/2000 | Tiede et al. |
| 6,042,196 A | 3/2000 | Nakamura et al. |
| 6,124,709 A | 9/2000 | Allwine |
| 6,151,175 A | 11/2000 | Osha |
| 6,198,992 B1 | 3/2001 | Winslow |
| 6,217,177 B1 | 4/2001 | Rost |
| 6,218,828 B1 | 4/2001 | Bates et al. |
| 6,223,104 B1 | 4/2001 | Kamen et al. |
| 6,223,114 B1 | 4/2001 | Boros et al. |
| 6,268,800 B1 | 7/2001 | Howard |
| 6,292,094 B1 * | 9/2001 | Deng ............... B62D 7/159 340/431 |
| 6,301,548 B1 | 10/2001 | Gerum |
| 6,351,698 B1 | 2/2002 | Kubota et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,516,260 B2 | 2/2003 | Wetzel et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,668,225 B2 | 12/2003 | Oh et al. |
| 6,704,653 B2 | 3/2004 | Kuriya et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 * | 2/2006 | Lee ............... G05D 1/0891 180/445 |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,028,804 B2 | 4/2006 | Eki et al. |
| 7,032,705 B2 | 4/2006 | Zheng et al. |
| 7,046,127 B2 | 5/2006 | Boddy |
| 7,058,493 B2 | 6/2006 | Inagaki |
| 7,089,101 B2 | 8/2006 | Fischer et al. |
| 7,154,385 B2 | 12/2006 | Lee et al. |
| 7,159,890 B2 | 1/2007 | Craig et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 * | 9/2007 | Einig ............... B60T 8/1708 303/146 |
| 7,295,907 B2 | 11/2007 | Lu et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,425,889 B2 | 9/2008 | Widmann et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,504,995 B2 | 3/2009 | Lawrence et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,561,953 B2 * | 7/2009 | Yu ............... B62D 6/002 280/400 |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,715,953 B2 | 5/2010 | Shepard |
| 7,731,302 B2 | 6/2010 | Tandy, Jr. et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,953,536 B2 | 5/2011 | Katrak |
| 7,974,444 B2 | 7/2011 | Hongo |
| 8,010,252 B2 | 8/2011 | Getman et al. |
| 8,010,253 B2 | 8/2011 | Lundquist |
| 8,036,792 B2 | 10/2011 | Dechamp |
| 8,038,166 B1 | 10/2011 | Piesinger |
| 8,044,779 B2 | 10/2011 | Hahn et al. |
| 8,073,594 B2 | 12/2011 | Lee et al. |
| 8,157,284 B1 | 4/2012 | McGhie et al. |
| 8,165,770 B2 | 4/2012 | Getman et al. |
| 8,167,444 B2 | 5/2012 | Lee et al. |
| 8,170,726 B2 | 5/2012 | Chen et al. |
| 8,174,576 B2 | 5/2012 | Akatsuka et al. |
| 8,180,543 B2 * | 5/2012 | Futamura ............... B60T 8/1708 180/14.1 |

(56) References Cited

U.S. PATENT DOCUMENTS

| | | |
|---|---|---|
| 8,190,364 B2 | 5/2012 | Rekow |
| 8,191,915 B2 | 6/2012 | Freese et al. |
| 8,192,036 B2 | 6/2012 | Lee et al. |
| 8,215,436 B2 | 7/2012 | DeGrave et al. |
| 8,223,204 B2 | 7/2012 | Hahn |
| 8,244,442 B2 | 8/2012 | Craig et al. |
| 8,256,851 B2* | 9/2012 | Pelosse ............... B60T 7/20 303/123 |
| 8,260,518 B2 | 9/2012 | Englert |
| 8,267,485 B2 | 9/2012 | Barlsen et al. |
| 8,280,607 B2 | 10/2012 | Gatti et al. |
| 8,308,182 B2 | 11/2012 | Ortmann et al. |
| 8,326,504 B2 | 12/2012 | Wu et al. |
| 8,342,560 B2 | 1/2013 | Albers et al. |
| 8,380,390 B2 | 2/2013 | Sy et al. |
| 8,380,416 B2 | 2/2013 | Offerle et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,469,125 B2 | 6/2013 | Yu et al. |
| 8,498,757 B2 | 7/2013 | Bowden et al. |
| 8,504,243 B2 | 8/2013 | Kageyama |
| 8,547,401 B2 | 10/2013 | Mallinson et al. |
| 8,548,680 B2 | 10/2013 | Ryerson et al. |
| 8,548,683 B2 | 10/2013 | Cebon et al. |
| 8,571,777 B2 | 10/2013 | Greene |
| 8,576,115 B2 | 11/2013 | Basten |
| 8,626,382 B2 | 1/2014 | Obradovich |
| 8,675,953 B1 | 3/2014 | Elwell et al. |
| 8,755,984 B2 | 6/2014 | Rupp et al. |
| 8,768,535 B2 | 7/2014 | Kossira et al. |
| 8,807,261 B2 | 8/2014 | Subrt et al. |
| 8,811,698 B2 | 8/2014 | Kono et al. |
| 8,825,328 B2 | 9/2014 | Rupp et al. |
| 8,833,789 B2 | 9/2014 | Anderson |
| 8,886,400 B2 | 11/2014 | Kossira et al. |
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,102,271 B2 | 8/2015 | Trombley et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2* | 9/2015 | Chiu ............... B60D 1/30 |
| 9,132,856 B2 | 9/2015 | Shephard |
| 9,156,496 B2 | 10/2015 | Greenwood et al. |
| 9,164,955 B2 | 10/2015 | Lavoie et al. |
| 9,168,951 B2* | 10/2015 | Chiu ............... B62D 13/06 |
| 9,180,890 B2 | 11/2015 | Lu et al. |
| 9,187,124 B2 | 11/2015 | Trombley et al. |
| 9,227,474 B2 | 1/2016 | Liu |
| 9,238,483 B2 | 1/2016 | Hafner et al. |
| 9,248,858 B2 | 2/2016 | Lavoie et al. |
| 9,296,422 B2 | 3/2016 | Lavoie |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,352,777 B2 | 5/2016 | Lavoie et al. |
| 9,393,996 B2* | 7/2016 | Goswami ............ B62D 13/005 |
| 9,428,188 B2 | 8/2016 | Schwindt et al. |
| 9,434,414 B2 | 9/2016 | Lavoie |
| 9,500,497 B2 | 11/2016 | Lavoie |
| 9,610,975 B1* | 4/2017 | Hu ............... B62D 13/06 |
| 9,616,923 B2 | 4/2017 | Lavoie |
| 9,623,904 B2 | 4/2017 | Lavoie et al. |
| 9,676,377 B2 | 6/2017 | Hafner et al. |
| 9,827,818 B2 | 11/2017 | Hu et al. |
| 9,840,278 B2 | 12/2017 | Lavoie et al. |
| 2001/0024333 A1 | 9/2001 | Rost |
| 2001/0037164 A1 | 11/2001 | Hecker |
| 2002/0128764 A1 | 9/2002 | Hecker et al. |
| 2004/0017285 A1 | 1/2004 | Zielinski et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0222881 A1 | 11/2004 | Deng et al. |
| 2005/0000738 A1 | 1/2005 | Gehring et al. |
| 2005/0074143 A1 | 4/2005 | Kawai |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236201 A1 | 10/2005 | Spannheimer et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2007/0285808 A1 | 12/2007 | Beale |
| 2008/0143593 A1 | 6/2008 | Graziano et al. |
| 2008/0147277 A1 | 6/2008 | Lu et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0085775 A1 | 4/2009 | Otsuka et al. |
| 2009/0093928 A1 | 4/2009 | Getman et al. |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0280859 A1 | 11/2009 | Bergh |
| 2009/0300701 A1 | 12/2009 | Karaoguz et al. |
| 2009/0306861 A1 | 12/2009 | Schumann et al. |
| 2010/0063702 A1 | 3/2010 | Sabelstrom et al. |
| 2010/0171828 A1 | 7/2010 | Ishii |
| 2010/0272370 A1 | 10/2010 | Schilling et al. |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0181457 A1 | 7/2011 | Basten |
| 2011/0257860 A1* | 10/2011 | Getman ............... B60T 8/1755 701/70 |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0221168 A1 | 8/2012 | Zeng et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1* | 11/2012 | Dix ............... B60D 1/36 701/41 |
| 2012/0283910 A1 | 11/2012 | Lee et al. |
| 2012/0310594 A1 | 12/2012 | Watanabe |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0082453 A1 | 4/2013 | Padula |

(56) References Cited

U.S. PATENT DOCUMENTS

| | | |
|---|---|---|
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2013/0321347 A1 | 12/2013 | Kim |
| 2014/0005918 A1 | 1/2014 | Qiang |
| 2014/0012465 A1 | 1/2014 | Shank et al. |
| 2014/0025260 A1 | 1/2014 | McClure |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088824 A1 | 3/2014 | Ishimoto |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0210456 A1 | 7/2014 | Crossman |
| 2014/0218506 A1 | 8/2014 | Trombley et al. |
| 2014/0218522 A1* | 8/2014 | Lavoie .................. G08G 1/0962 348/148 |
| 2014/0222288 A1* | 8/2014 | Lavoie .................... G06F 17/00 701/41 |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0002670 A1 | 1/2015 | Bajpai |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217693 A1 | 8/2015 | Pliefke et al. |
| 2015/0269444 A1 | 9/2015 | Lameyre et al. |
| 2016/0001705 A1 | 1/2016 | Greenwood et al. |
| 2016/0009288 A1 | 1/2016 | Yu |
| 2016/0023525 A1 | 1/2016 | Lavoie |
| 2016/0039456 A1 | 2/2016 | Lavoie et al. |
| 2016/0059780 A1 | 3/2016 | Lavoie |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0229452 A1 | 8/2016 | Lavoie et al. |
| 2016/0257341 A1* | 9/2016 | Lavoie ................... B62D 13/06 |
| 2016/0280267 A1 | 9/2016 | Lavoie et al. |
| 2016/0332606 A1* | 11/2016 | Buchner ................... B60T 7/20 |
| 2017/0073005 A1 | 3/2017 | Ghneim et al. |
| 2017/0101130 A1 | 4/2017 | Lavoie |
| 2017/0106796 A1 | 4/2017 | Lavoie et al. |
| 2017/0174130 A1 | 6/2017 | Hu et al. |
| 2017/0297619 A1 | 10/2017 | Lavoie et al. |
| 2017/0297620 A1 | 10/2017 | Lavoie et al. |
| 2017/0313351 A1 | 11/2017 | Lavoie |

FOREIGN PATENT DOCUMENTS

| | | |
|---|---|---|
| DE | 3931518 A1 | 4/1991 |
| DE | 9208595 U1 | 8/1992 |
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10154612 A1 | 5/2003 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 102012005707 A1 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0418653 A1 | 3/1991 |
| EP | 0433858 A2 | 6/1991 |
| EP | 1361543 A2 | 11/2003 |
| EP | 1593552 B1 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |

(56) References Cited

FOREIGN PATENT DOCUMENTS

| | | |
|---|---|---|
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A1 | 2/2008 |
| JP | 2012105158 A | 5/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2014019730 A1 | 2/2014 |
| WO | 2014037500 A1 | 3/2014 |
| WO | 2014070047 A1 | 5/2014 |
| WO | 2014092611 A1 | 6/2014 |
| WO | 2014123575 A1 | 8/2014 |
| WO | 2015074027 A1 | 5/2015 |
| WO | 2015187467 A1 | 12/2015 |

OTHER PUBLICATIONS

Kristopher Bunker, "2012 Guide to Towing", Trailer Life, 2012, 38 pages.
A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.
L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.
M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.
F.W. Kienhöfer; D. Cebon, "An Investigation of ABS Strategies for Articulated Vehicles", Cambridge University, Engineering Department, United Kingdom, date unknown, 13 pages.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.
Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.
J. Roh; H. Lee; W. Chung, "Control of a Car with a Trailer Using the Driver Assistance System", IEEE, International Conference on Robotics and Biomimetics; Phuket, Thailand, Dec. 2011, 6 pages.
A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.
Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up Control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, R.M. Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Dieter Zöbel, David Polock, Philipp Wojke, "Steering Assistance for Backing Up Articulated Vehicles", Systemics, Cybernetics and Informatics; vol. 1, No. 5, date unknown, 6 pages.
J.R. Billing; J.D. Patten; R.B. Madill, "Development of Configurations for Infrastructure-Friendly Five- and Six-Axle SemiTrailers", National Research Council of Canada and Ontario Ministry of Transportation, date unknown, 11 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Andri Riid, Alar Leibak, Ennu Rüstern, "Fuzzy Backing Control of Truck and Two Trailers", Tallinn University of Technology; Tallinn, Estonia, date unknown, 6 pages.
Jane McGrath, "How to Avoid Jackknifing", A Discovery Company, date unknown, 3 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Jujnovich, B.; Roebuck, R.; Odhams, A.; David, C., "Implementation of Active Rear Steering of a Tractor Semitrailer", Cambridge University, Engineering Department; Cambridge, United Kingdom, date unknown, 10 pages.
A.M.C. Odhams; R.L. Roebuck; C. Cebon, "Implementation of Active Steering on a Multiple Trailer Long Combination Vehicle", Cambridge University, Engineering Department; Cambridge, United Kingdom, date unknown, 13 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, SAGE Journals, vol. 225, No. 7, Jul. 2011, 1 page.

(56) References Cited

OTHER PUBLICATIONS

Haviland, G S, "Automatic Brake Control for Trucks—What Good Is It?", TRID, Society of Automotive Engineers, Sep. 1968, 1 page.

William E. Travis; David W. Hodo; David M. Bevly; John Y. Hung, "UGV Trailer Position Estimation Using a Dynamic Base RTK System", American Institute of Aeronautics and Astronautics, date unknown, 12 pages.

"VSE Electronic Trailer Steering", ETS for Trailers, version 2009, VSE Trailer Systems B.V., 2009, 28 pages.

"Telematics Past, Present, and Future," Automotive Service Association, www.ASAshop.org, May 2008, 20 pages.

"Fully Automatic Trailer Tow Hitch With LIN Bus," https://webista.bmw.com/webista/show?d=1860575499&lang=engb&print=1, date unknown, 5 pages.

"VBOX Yaw Rate Sensor With Integral Accelerometers," Racelogic, www.racelogic.co.uk, date unknown, 2 pages.

P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.

Olof Enqvist, "AFS—Assisted Trailer Reversing," Institutionen för systemteknik Deartment of Electrical Engineering, Jan. 27, 2006, 57 pages.

Tofel, Kevin C., "How to measure anything with a camera and software", Feb. 6, 2007, 6 pgs. [Retrieved from http://giaom.com/2007/06/how_to_measure/ on Sep. 4, 2014].

Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.

Sonnenberg, Jan, "Service and User Interface Transfer from Nomadic Devices to Car Infotainment Systems", Second International Conference on Automotive User Interfaces and Interactive Vehicular Applications (Automotive UI), Nov. 11-12, 2010, pp. 162-165.

Ratajczak, Robert; Grajek, Tomasz; Wegner, Krzysztof; Klimaszewski, Krzusztof; Kurc, Maciej; Domański, Marek, "Vehicle Dimensions Estimation Scheme Using AAM on Sterescopic Video", date unknown, pp. 4321-4325.

"Measure and Calculate Distance", Help Forum, Google Maps, 1 pg. [Retrieved from https://support.google.com/maps/answer/1628031?hl=en on Sep. 4, 2014].

De Brito, Jr., Jailson A.; De Campos, Luis Edmundo Prado; "Automatic Vehicle Classification Using Learning-based Computer Vision and Fuzzy Logic", Department de Ciencia da Computacao, Instituto de Matematics, Universidade Federal da Bahia, date unknown, 4 pgs.

Dlagnekov, Louka; Belongie, Serge, "Recognizing Care", Department of Computer Science and Engineering, University of California, San Diego, CA, date unknown, pp. 1-8.

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

Olof Enqvist, "AFS-Assisted Trailer Reversing," Institutionen för systemteknik Deartment of Electrical Engineering, Jan. 27, 2006, pp. 1-57.

\* cited by examiner

INERTIAL REFERENCE FOR TBA SPEED LIMITING

FIELD OF THE INVENTION

The present invention generally relates to controlling a vehicle and trailer while the vehicle is backing up, and in particular to a control system that utilizes the ratio of trailer yaw rate to vehicle velocity as a control parameter.

BACKGROUND OF THE INVENTION

Various methods and systems have been developed for trailer backup control and assist. Such methods/systems may limit vehicle speed and/or steering to avoid jackknife or other undesirable operating conditions. However, known systems may suffer from various drawbacks.

SUMMARY OF THE INVENTION

One aspect of the present disclosure is a method of controlling a vehicle while the vehicle is backing up with a trailer attached to the vehicle. The method includes determining a value of a control parameter, wherein the control parameter takes into account trailer yaw rate and vehicle speed. The control parameter may comprise a ratio of the trailer yaw rate to the vehicle speed. The method further includes determining a maximum allowable vehicle speed as a function of the control parameter utilizing predefined criteria that defines maximum allowable vehicle speeds based on the control parameter. The method further includes limiting the vehicle speed to prevent the vehicle from exceeding the maximum allowable vehicle speed. The speed of the vehicle may be limited by controlling at least one of a brake system and power train system of the vehicle. The speed of the vehicle can be limited to prevent jackknife and/or to avoid getting too close to a jackknife condition according to predefined criteria.

Another aspect of the present disclosure is a method of controlling a vehicle utilizing a trailer backup assist control system. The method includes calculating a current value of a control parameter by dividing measured trailer yaw rate by measured vehicle speed. The method includes causing the vehicle to reduce speed if the current value of the control exceeds an allowable limit that is determined using the measured vehicle speed.

Another aspect of the present disclosure is a trailer backup assist control system including a sensor configured to provide data concerning vehicle speed in a reverse direction. The system further includes a sensor that is configured to provide data concerning at least one of a trailer yaw angle and a trailer yaw rate. A controller is configured to limit vehicle speed in a reverse direction by controlling at least one of a vehicle brake system and a vehicle powertrain system. The control system is configured to limit vehicle speed in a reverse direction to avoid operating in a manner that is contrary to predefined acceptable operating criteria. The predefined acceptable operating criteria comprises maximum allowable values of a ratio of trailer yaw angle to vehicle speed for corresponding vehicle speeds. The control system determines a ratio of trailer yaw angle to vehicle speed as a control variable and limits vehicle speed in a reverse direction if the value of the control variable exceeds the maximum allowable value for the vehicle speed. The predefined acceptable operating criteria may comprise a control jackknife condition in which no steered wheel angle will change the sign of the control variable. The predefined criteria may alternatively comprise a collision jackknife, or a combination of control and collision jackknife.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 4:
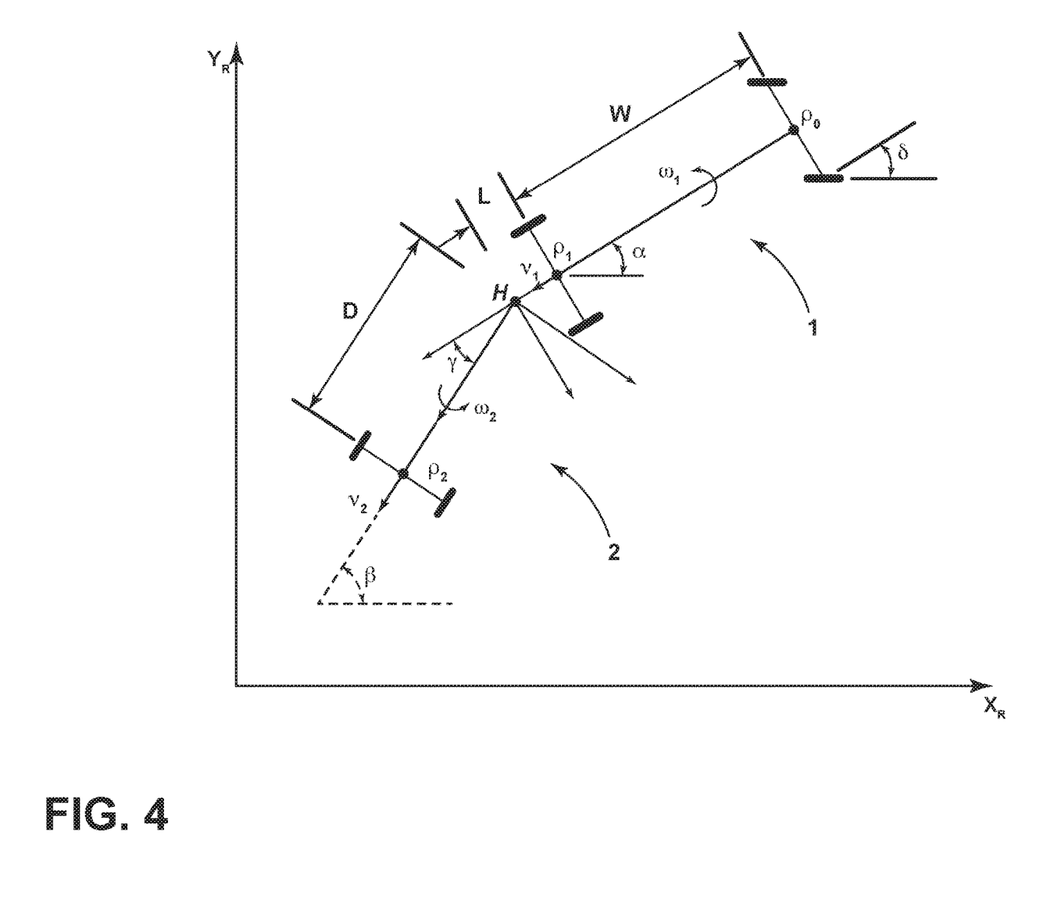
FIG. 4 is a kinematic model of a vehicle-trailer system.

For purposes of description herein, the terms "upper," "lower," "right," "left," "rear," "front," "vertical," "horizontal," and derivatives thereof shall relate to the invention as oriented in FIG. 4. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Known methods of controlling a vehicle while backup up with a trailer may have various limitations. For example, existing control schemes may require that the hitch angle, trailer length, and hitch offset. Whether the hitch angle or only the trailer yaw rate is measured, reliable estimation of trailer length typically requires a moderate change in hitch angle. Thus the accuracy of an estimate depends on the maneuver executed. Furthermore, when the hitch angle must be estimated on the basis of trailer yaw rate measurements, known methods do not provide either a trailer length or a hitch angle estimate until the maneuver satisfies particular conditions. These factors limit the ability of the controller to meet desired performance criteria during some initial learning period whose duration is maneuver-dependent. During such a learning period, the controller must be conservative with respect to meeting driver-requested curvature, and may fail to prevent jackknife under certain conditions.

The present disclosure addresses this limitation by providing a trailer backup control system and method that uses trailer yaw rate measurements, but does not require knowledge or estimates of instantaneous hitch angle, trailer length, or hitch offset in order to ensure stability and jackknife avoidance. The control system and method is not unduly conservative in the sense that it can control the trailer very close to jackknife. The method is applicable to fifth wheel and conventional trailers, and may utilize modified trailer curvature (the ratio of yaw rate to vehicle speed) as a control input/parameter/variable. When the hitch angle is small, the modified curvature is approximately equal to the true curvature, making it an intuitive quantity for a driver to command. The modified trailer curvature-based control described herein may be utilized during initial backup operations to prevent jackknife or other unacceptable operating conditions during the learning period. Alternatively, the modified curvature control scheme described herein may be used instead of control systems that require knowledge of hitch angle, trailer length, and hitch offset. In general, the method described herein utilizes yaw rate and vehicle speed as control inputs. It will be understood, however, that the present disclosure is not limited to a ratio of yaw rate to vehicle speed, and these inputs may be utilized without taking a ratio of these inputs. In general, trailer yaw rate and vehicle speed can be utilized to control or limit vehicle speed and/or vehicle steering while a vehicle is backing up with a trailer attached thereto.

As discussed in more detail below, the present disclosure includes a method of controlling a vehicle 1 (FIG. 1) having a brake system 4 and a powertrain system 6. The method involves controlling the vehicle while the vehicle is backing up with a trailer 2 attached to the vehicle 1. Trailer 2 defines a hitch angle $\gamma$ relative to the vehicle 1. The method includes determining a trailer yaw rate relative to the vehicle 1 (FIG. 4). A control variable or parameter such as a modified trailer curvature ($\eta$) (Equation 3, below) is estimated. The modified trailer curvature $\eta$ comprises a ratio of the trailer yaw rate $\dot{\gamma}$ (Equation 4) to the vehicle speed $V_1$ (Equation 5). The method includes determining a maximum allowable vehicle speed as a function of trailer yaw rate and vehicle speed utilizing predefined criteria that defines maximum allowable vehicle speed based on trailer yaw rate and vehicle speed. An example of a predefined criteria is discussed in more detail below in connection with FIG. 6. The method further includes limiting vehicle speed to prevent exceeding the maximum allowable vehicle speed. Vehicle speed may be limited by controlling at least one of the brake system 4 and power train system 6 of vehicle 1. Yaw rate and vehicle sped may also be utilized to control steering of a vehicle while the vehicle is backing up with a trailer attached to the vehicle.

Figure 1:
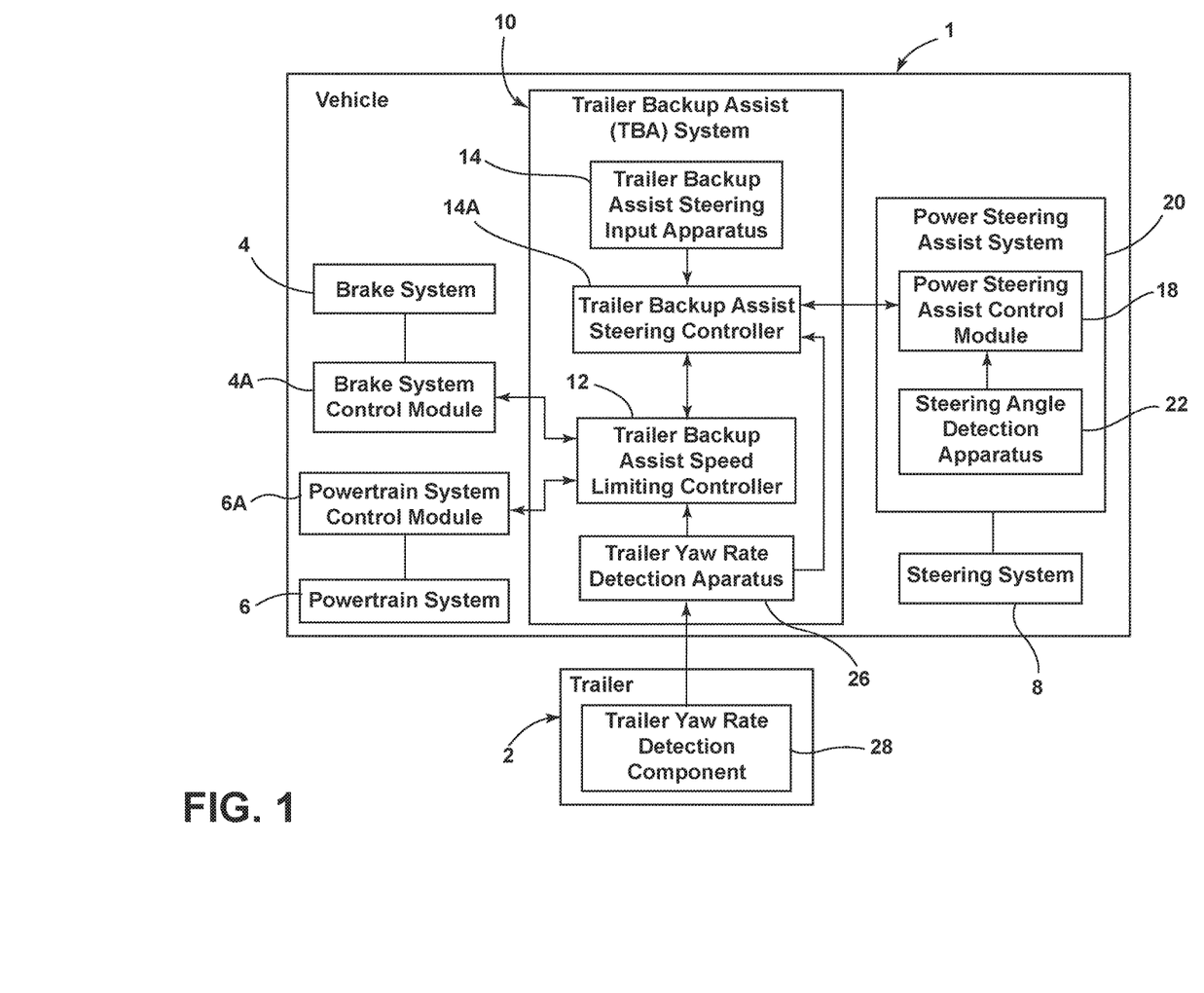
FIG. 1 is a block diagram showing a vehicle having a trailer backup assist (TBA) system according to one aspect of the present disclosure.

With reference to FIG. 1, vehicle 1 may comprise a motor vehicle having an internal combustion engine, electrical drive system, or a combination thereof (e.g. a hybrid drive system). Vehicle 1 may include a trailer backup assist (TBA) system 10 that is configured to assist a vehicle operator when backing up with a trailer 2 attached to the vehicle 1. It will be understood that vehicle 1 may include a wide variety of engines, drive trains, brake systems, and other such components. In addition to brake system 4, and powertrain system 6, vehicle 1 also includes a steering system 8. Virtually any type of brake system 4, powertrain system 6, and/or steering system 8 may be utilized, and the present invention is not limited to any specific system or configuration.

A brake system control module 4A (FIG. 1) is operably connected to the brake system 4, and a power train system control module 6A is operably connected to power train system 6. The brake system control module 4A and power train system control module 6A are operably connected to a trailer backup assist speed limiting controller 12 of TBA system 10. The TBA speed limiting controller 12 is operably connected to a trailer backup assist steering input apparatus 14, which may comprise a rotatable knob 16 as discussed in more detail below in connection with FIG. 3. A trailer backup assist steering controller 14A is operably connected to the input apparatus 14. The TBA steering controller 14A is operably connected to a power steering assist control module 18 of power steering assist system 20. The power steering assist system 20 is operably connected to steering system 8. The power steering assist system 20 includes a steering angle detection apparatus 22 that is configured to measure a steering angle $\delta$ of steered wheels 24 (FIG. 4) of vehicle 1.

The TBA system 10 also includes a trailer yaw rate detection apparatus 26 (FIG. 1) that is operably connected to a trailer yaw rate detection component 28 of trailer 2. In general, trailer 2 may comprise a fifth wheel/gooseneck trailer, or it may comprise a conventional trailer. As discussed below, the different trailer configurations may have different hitch offsets "L" (FIG. 4). Yaw rate detection component 28 may comprise a yaw rate sensor (e.g. gyroscope) that is positioned on the trailer 2, and the trailer yaw rate may be directly measured. Alternatively, a hitch angle sensor (not shown) may be utilized to measure the hitch angle $\gamma$, and the trailer yaw rate may be calculated/estimated by taking a time derivative of the hitch angle to determine a hitch angle rate. Specifically, if vehicle 1 includes a yaw rate sensor, the measured (estimated) trailer yaw rate is the sum (when using the sign conventions herein) of the vehicle yaw rate and the hitch angle rate. It will be understood that a trailer yaw angle may also be measured, and a time derivative of the measured trailer yaw angle may be utilized to determine a measured trailer yaw rate.

Figure 2:
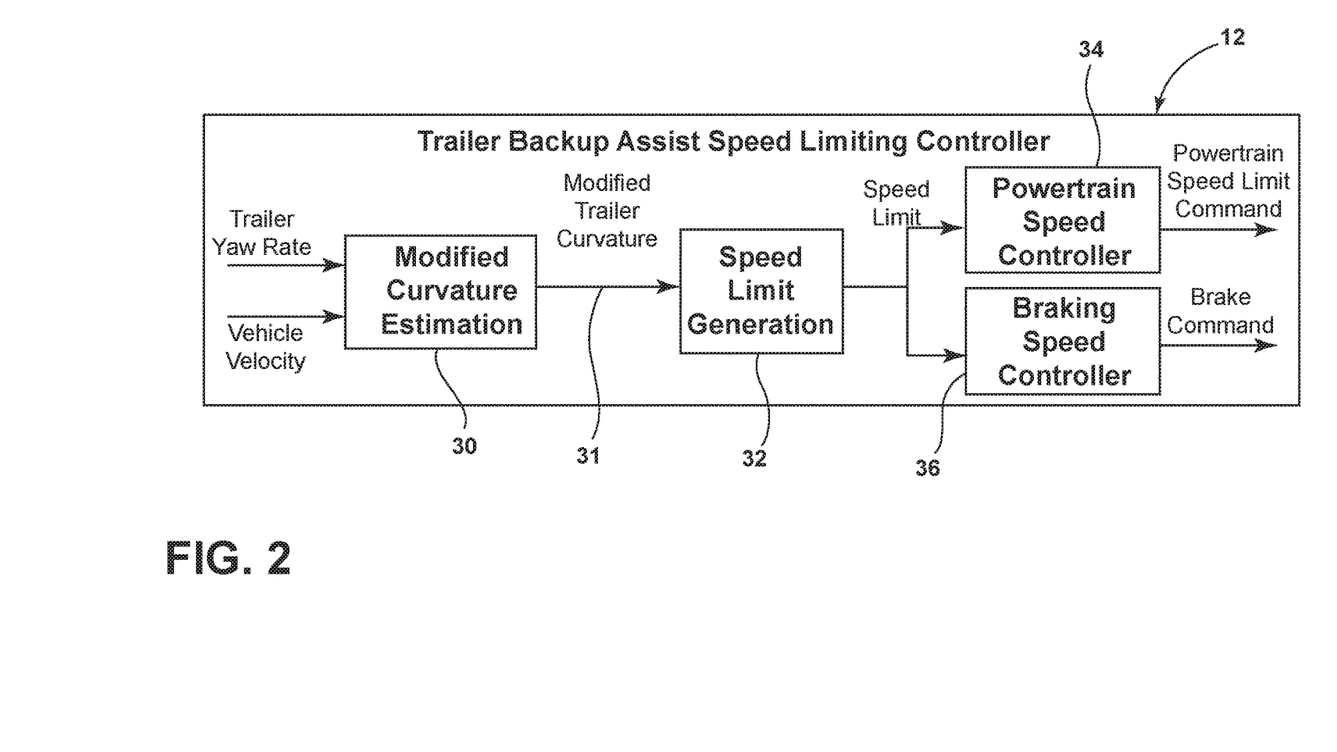
FIG. 2 is a block diagram of the trailer backup assist speed limiting controller of FIG. 1.
Figure 6:
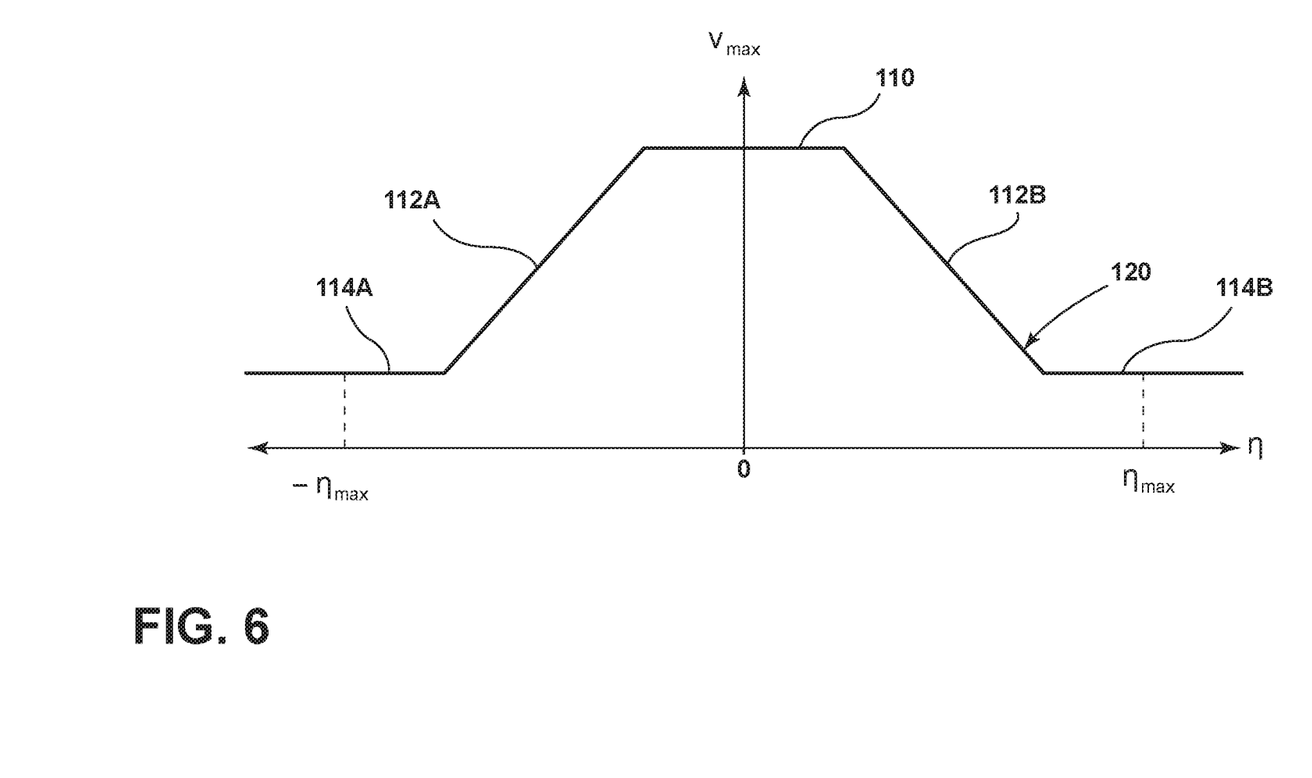
FIG. 6 shows a modified curvature-based speed limit function.

The speed of vehicle 1 during trailer backup is controlled/limited based on measured trailer yaw rate and vehicle speed. With further reference to FIG. 2, control of vehicle 1 may utilize a modified trailer curvature estimation 30 that is determined utilizing trailer yaw rate and vehicle velocity. The modified trailer curvature 31 and, optionally, other inputs (e.g. driver steering curvature requests) is then utilized to generate or determine a speed limit (maximum allowable vehicle speed) as shown at block 32. The speed limit generation 32 may comprise a jackknife condition or other predefined operating criteria as discussed in more detail below. For example, speed limit generation 32 may comprise determining a predefined maximum speed for the modified trailer curvature (FIG. 6). The speed limit from the speed limit generation 32 is then provided to a power train speed controller 34 and/or a braking speed controller 36. The powertrain and braking speed controllers 34 and 36, respectively, may be configured to generate a powertrain speed limit command and a brake command, respectively. The powertrain and braking speed controllers 34 and 36 may be integrated with the powertrain system control module 6A and brake system control module 4A (FIG. 1), or they may comprise separate components.

Figure 3:
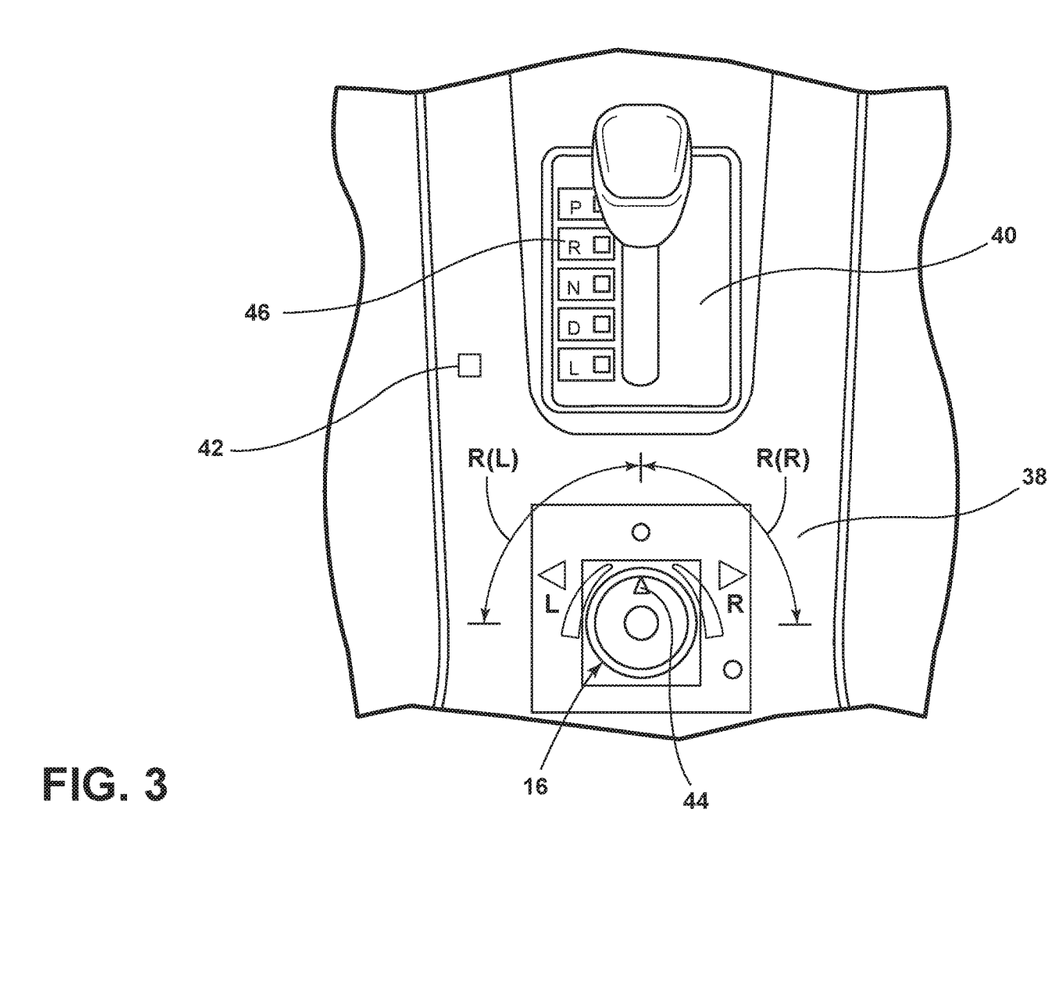
FIG. 3 is a partially fragmentary view of a portion of a vehicle interior including a driver input device that may be utilized by a vehicle operator to provide steering input during vehicle backup with a trailer attached to the vehicle.

With reference to FIG. 3, the steering input 14 utilized by the TBA system 10 may comprise a rotatable knob 16. Knob 16 may be mounted on a center console 38 in a vehicle interior directly adjacent a gear selection lever 40. In use, a user may activate the TBA system 10 by actuating a user input feature such as a button 42. In general, a user may position gear selector 40 in the "R" position 46, and then actuate input feature/button 42 to activate the TBA system 10. It will be understood that the TBA system 10 may be actuated to assist a user when backing up with a trailer utilizing various inputs, and button 42 is merely an example of one such activation feature. As vehicle 1 is being backed up with a trailer 2 attached thereto, a user may rotate knob 16 to the right or left as shown by the letters "R" and "L." Knob 16 may include indicia 44 that enables an operator to determine what the angle of knob 16 is during backup. The knob 16 may have a maximum rotational angle of +/−90° as shown by the arrows designated R (L), R (R).

During vehicle backup with TBA system 10 activated, the power steering assist control module 18 (FIG. 1) controls the angle δ (FIG. 4) of the steered wheels 24 of vehicle 1 based on user inputs from rotatable knob 16 and other control parameters. Thus, when TBA system 10 is activated and vehicle 1 and trailer 2 are backing up, the user provides steering inputs utilizing rotatable knob 16 rather than the steering wheel (not shown) of vehicle 1. The power steering assist control module 18 may adjust the angle of steered wheels 24 based on various control parameters (e.g. vehicle speed and trailer hitch angle), such that the angle δ of the steered wheels 24 may not always correspond directly to the steering angle command input provided by rotatable knob 16.

Kinematic Model

The variables utilized in a kinematic model of a vehicle 1 and trailer 2 are shown in FIG. 4. Under standard assumptions, the differential kinematics for A vehicle-trailer model according to the present disclosure may be given by $$\dot{\gamma} = \frac{v_1}{D}\sin\gamma - \left(1 + \frac{L}{D}\cos\gamma\right)\frac{v_1}{W}\tan\delta, \quad (1)$$

where $\gamma := \beta - \alpha$ is the hitch angle, $v_1$ is the velocity of the rear axle of the tow vehicle, δ is the road wheel angle of the tow vehicle, L is the hitch offset, D is the trailer length, and W is the tow vehicle wheelbase. We assume the road wheel angle is limited to $-\delta_{max} \le \delta \le \delta_{max}$. We also adopt the convention that $v_1 \ge 0$ when the vehicle is in reverse. These quantities are illustrated in FIG. 4.

For the purpose of control, the term "control jackknife" is used herein to mean any configuration in which the hitch angle is locally uncontrollable with the vehicle in reverse. This is distinct from the notion of jackknife as a collision between the vehicle and the trailer, which is referred to herein as "collision jackknife." In general, the control jackknife angle (as used here) may be greater than or less than the hitch angle at which the trailer and the vehicle collide. Thus, while the controller will attempt to prevent control jackknife, but collision jackknife avoidance may require additional information about the vehicle and trailer geometry.

The control jackknife angle is given by $\gamma_{jk} = \Gamma(\eta_{jk}, D, L)$ where $\eta_{jk} = \tan(\delta_{max})/W$ is the maximum vehicle curvature and $$\Gamma(\eta_1, D, L) = \text{sgn}(\eta)\cos^{-1}\left(\frac{-DL\eta^2 + \sqrt{1-(D^2-L^2)\eta^2}}{1+L^2\eta^2}\right) \quad (2)$$

Control jackknife is not possible if $D^2 - L^2 > 1/\eta^2_{jk}$.

Modified Curvature Control

A controller according to the present disclosure may also control steering to prevent control jackknife. A driver input $\kappa(t) \in [-1, 1]$ representing a normalized desired trailer curvature and a trailer yaw rate measurement $\omega_2(t)$ may be utilized to determine an appropriate road wheel angle δ to prevent control jackknife. Furthermore, the controller may be configured to drive the trailer curvature $\kappa_2(t)$ approximately to the desired curvature $\kappa_d(t) := \kappa_{max} \kappa(t)$, where $\kappa_{max} = \sin(\gamma_{jk})/(L + D\cos\gamma_{jk})$. This approximate asymptotic curvature tracking is achieved even if the controller does not know γ and cannot compute the maximum curvature $\kappa_{max}$ or the control jackknife angle $\gamma_{jk}$ because the controller does not know D or L.

Modified Curvature

A controller according to the present disclosure may utilize a control parameter that takes into account vehicle speed and trailer yaw rate. The control parameter may comprise modified trailer curvature (η), which is defined as:

$$\eta = \frac{\sin\gamma}{D} - \frac{L\cos\gamma}{D}\frac{\tan\delta}{W} \quad (3)$$

the hitch angle dynamics equation (1) can be rewritten in terms of η as:

$$\dot{\gamma} = v_1\eta - v_1\frac{\tan\delta}{W} \quad (4)$$

As $\dot{\gamma} = \omega_2 - \omega_1$ and $\omega_1 = v_1\tan(\delta)/W$, we have $\omega_2 = v_1\eta$, or, when $|v_1| > 0$, $$\eta = \frac{\omega_2}{v_1} \quad (5)$$

Thus, if the vehicle is moving, η can be determined (computed) from measurements of vehicle velocity and trailer yaw rate without knowing γ, D, or L. Furthermore, the trailer curvature $\kappa_2$ satisfies $$\kappa_2 = \frac{\omega_2}{v_2} = \frac{1}{\cos\gamma + L\sin\gamma\frac{\tan\delta}{W}}\eta \quad (6)$$

so $\eta = \kappa_2$ when γ is small. Just as with the trailer curvature, when taken as an output for the dynamics equation (1), the modified curvature has relative degree one when L=0 and relative degree zero when L≠0.

It is useful to rewrite the hitch angle dynamics in terms of the distance $s_1$ traveled by the rear vehicle axle. Because $v_1 = ds_1/dt$, the chain law implies that $$\frac{d\gamma}{ds_1} = \eta - \frac{\tan\delta}{W} \quad (7)$$

From the new expression, it is seen that hitch angle equilibrium is equivalent to $\eta = \tan(\delta)/W = \kappa_1$, where $\kappa_1$ is the vehicle curvature, and control jackknife corresponds to the equilibrium with $|\delta| = \delta_{max}$, or $|\eta| = \eta_{jk}$.

The preceding observations justify regarding the driver input κ(t) as a normalized, desired modified curvature command, which is formalized through the definition.

$$\eta_d(t) := \eta_{jk}\kappa(t) \quad (8)$$

Figure 5A:
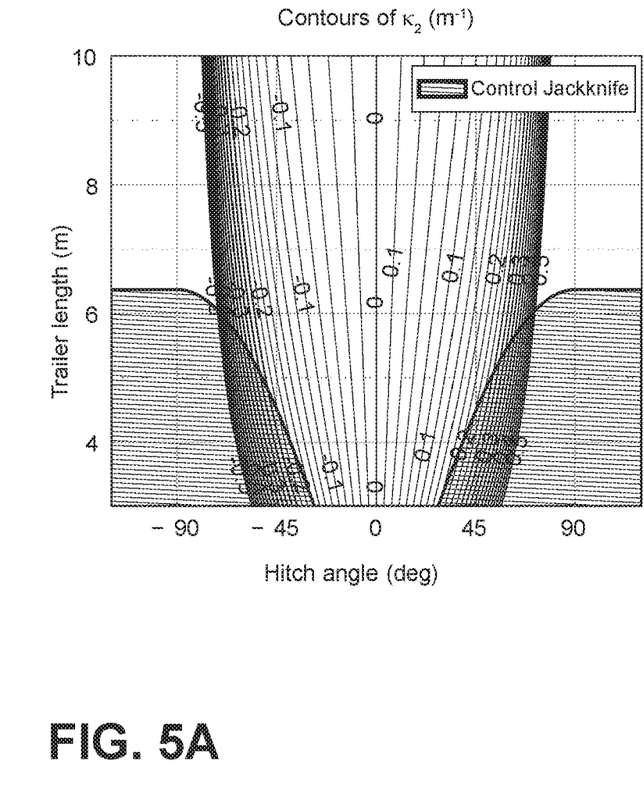
FIG. 5A shows contours of trailer curvature $\kappa_2$ for L=0 m, W=3.98 m, and $\delta_{max}$=32°.
Figure 5B:
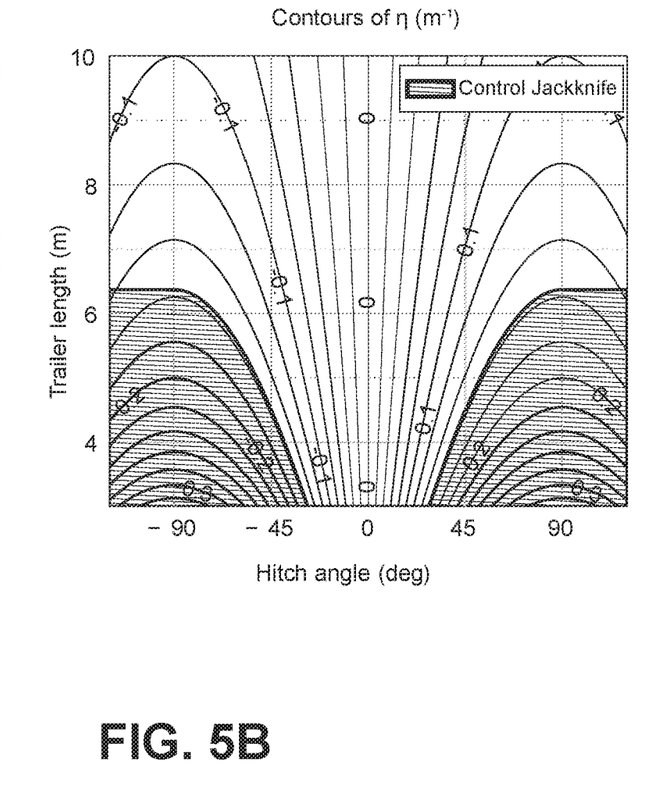
FIG. 5B shows contours of modified curvature $\eta$ for L=0 m, W=3.98 m, and $\delta_{max}$=32°.

FIGS. 5A and 5B compare the trailer curvature $\kappa_1$ (FIG. 5A) with the modified curvature η (FIG. 5B) for a particular choice of L, W, and $\delta_{max}$. FIGS. 5A and 5B clearly illustrate the relationship between the modified curvature η and the jackknife limit (where it exists), which limit is simply the $\eta_{jk}$-level curve of the modified curvature $\eta$. Unlike the true curvature, the modified curvature $\eta$ is finite and continuous even at large hitch angles. Even when L≠0 the hitch angle at which the trailer curvature $\kappa_2$ is infinite is precisely the hitch angle at which the modified curvature $\eta$ reaches its maximum value for a given D. This can be seen by comparing the denominator in equation (6) with the partial derivative of $\eta$ with respect to $\gamma$.

Control Jackknife Detection and Margin

A measure of the system's proximity to control jackknife can be utilized to implement a speed limiting system/method according to one aspect of the present disclosure. Recalling the previous definition, the system is jackknifed (control jackknife) when the hitch angle is locally uncontrollable, or, in other words, when the hitch angle is such that there is no admissible choice of wheel angle which reverses the sign of $d\gamma/ds_1$ (or, equivalently, of $\dot\gamma$). The boundary of the control jackknife region corresponds to the equilibrium $\bar\eta = \eta j\kappa$. Based on this definition, one method to detect control jackknife is to detect the sign of $\dot\gamma$ as soon as the vehicle starts moving, then to immediately drive the wheel angle to its limit in the proper direction. If the sign of $\dot\gamma$ changes, then the system is not control jackknifed. The following methods detect control jackknife and determine proximity to control jackknife without saturating the wheel angle.

When it is known that L=0, modified curvature provides a simple solution. In this case, the modified curvature is independent of the wheel angle, so it is sufficient to compare the instantaneous value of $\eta$ to $\eta j\kappa$; if $|\eta| \geq \eta j\kappa$, then the system is control jackknifed. Furthermore, the map $\eta \to |\eta/\eta j\kappa|$ provides a measure of the proximity to control jackknife, with small values ($|\eta/\eta j\kappa| \ll 1$) indicating a large control jackknife margin, and values closer to unity indicating a smaller control jackknife margin. When L=0 and $\gamma \in [-90°, 90°]$, $\eta/\eta j\kappa = \sin\gamma/\sin\gamma j\kappa$, so this measure is related by a nonlinear transformation to a (parameter-dependent) hitch angle-based measure of proximity to control jackknife.

For general L, the value $|\eta/\eta_{jk}|$ provides a meaningful measure of the proximity to control jackknife when the system is in equilibrium, that is, when $\eta = \tan(\delta)/W$ (see (4)). Thus, one heuristic measure of "proximity" to control jackknife is the absolute value of the function $$\rho(\eta, \kappa_1) = \frac{\eta + c(\eta - \kappa_1)}{\eta_{jk}}, \qquad (9)$$

where $0 \leq c < 1$ is a constant parameter. The term $c(\eta - \kappa_1)/\eta_{jk}$ penalizes (by increasing $\rho(\eta, \kappa_1)|$) deviations from equilibrium which will drive the hitch angle closer to control jackknife.

Speed Limiting

It is often more convenient to study the trailer backing problem in a velocity-invariant framework. However, vehicle velocity may be limited to ensure that the TBA system remains active. Furthermore, control jackknife avoidance is improved by reducing the maximum allowed vehicle speed as the hitch angle approaches $\gamma_{jk}$.

The following disclosure describes a parameterless speed limiting approach based on trailer yaw rate and vehicle speed (e.g. the modified curvature).

Speed limiting can be realized by specifying the desired speed limit $v_{max}$ as a function of the modified curvature $\eta$. As $\eta_{max} = \tan(\delta_{max})/W$ is a function of known vehicle parameters, it is possible to specify a reasonable speed limit (maximum allowable vehicle speed) as a function of modified curvature $\eta$. One example is illustrated in FIG. 6. When L=0, this method is analogous to known methods that are based on hitch angle. However, when L≠0, the value $\rho(\eta, \kappa_1)$ in place of $\eta$, and the limits ±1 can be used in place of $\pm\eta_{max}$.

In FIG. 6, a maximum allowable speed for vehicle 1 during trailer backup with TBA system 10 activated is shown by line 120. Horizontal line segment 110 represents an overall maximum allowable speed for vehicle 1 during backup operations in which the TBA system 10 is activated. This speed may be about, for example, 5 or 10 mph. This speed limit is typically selected to be low enough to ensure that a vehicle operator will have time to react if braking and/or steering inputs are required to avoid an object and to ensure that the operator will be able to control vehicle 1. Referring again to FIG. 6, sloped line segments 112A, 112B extend between horizontal line segment 110 and horizontal outer line segments 114A, 114B. Outer line segments 114A, 114B represent very low vehicle speeds (e.g. 0.5 mph, 1 mph or 2 mph) when vehicle 1 is approaching a jackknife condition. Thus, in the example of FIG. 6, the maximum allowable speed is reduced linearly as the absolute value of the modified curvature $\eta$ increases. This ensures that the speed of vehicle 1 is reduced as a jackknife condition ($-\eta_{max}$ or $\eta_{max}$) is approached. The controller may be configured to stop vehicle 1 if a jackknife condition ($-\eta_{max}$ or $\eta_{max}$) is reached to prevent any additional motion in a reverse direction, and an alert may be provided to the operator indicating that a jackknife condition has been reached, and that the vehicle must be moved in a forward direction. The alert may comprise an audio alert and/or a visual alert/message.

It will be understood that the speed limit line 120 of FIG. 6 is merely an example of one possible speed limit control arrangement. In general, higher speeds are allowed when modified curvature $\eta$ is zero or near zero, and the allowed vehicle speed is reduced at grater (absolute) values of $\eta$. The maximum allowable absolute value of $\eta$ may vary depending on the particular vehicle. Typically, the absolute value of $-\eta_{max}$ and $\eta_{max}$ are about 0.10 or 0.12. Also, it will be understood that the maximum allowable speed may be determined utilizing trailer yaw rate and vehicle speed without calculating modified trailer curvature. For example, control jackknife may be determined using trailer yaw rate taking into account vehicle speed without calculating a ratio of these measured variables.

Estimation of Modified Curvature $\eta$

In principle, the modified curvature $\eta$ can be determined (calculated) from vehicle velocity measurements and trailer yaw rate measurements using equation (5), provided that the vehicle velocity is nonzero. Furthermore, if the vehicle is in motion and subsequently comes to a stop, we have only to recall the last value of $\eta$ before the velocity reaches zero, as long as it is safe to assume that the hitch angle is unchanged. In practice, however, it is useful to modify this strategy for computing, or, more accurately, estimating, $\eta$.

The first modification is to specify some positive threshold $\in v_1$, and to update the estimate of $\eta$ only when $|v_1| > \in v_1$. In addition to avoiding divide-by-zero, this modification may also reduce the effect of velocity sensor nonlinearities.

Also, a low-pass filter may be applied to the estimate of $\eta$. The low-pass filter attenuates sensor noise (including quantization noise), which could otherwise have a significant effect on the estimate of $\eta$ at low speeds. With a suitable realization, the filter state can be used to hold the value of η while updates are disabled. One such realization in discrete-time is given by $$\hat{\eta}[\kappa] = \begin{cases} a\dfrac{\omega_2[\kappa]}{v_1[\kappa]} + (1-a)\hat{\eta}[\kappa-1], & \text{if } |v_1| > \varepsilon_{v1} \\ \hat{\eta}[\kappa-1], & \text{otherwise} \end{cases} \qquad (10)$$

where a ∈(0, 1] is the normalized filter bandwidth.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of controlling a vehicle while the vehicle is backing up with a trailer attached to the vehicle, the method comprising:
    utilizing a sensor to determine a trailer yaw rate;
    utilizing a sensor to determine a vehicle speed;
    determining a ratio of the trailer yaw rate and the vehicle speed;
    utilizing a controller to determine a maximum allowable vehicle speed as a function of the ratio of the trailer yaw rate and the vehicle speed utilizing predefined criteria that defines a maximum allowable vehicle speed based on the ratio of the trailer yaw rate and the vehicle speed; and
    utilizing a controller to prevent the vehicle from exceeding the maximum allowable vehicle speed.

2. The method of claim 1, wherein:
    limiting the vehicle speed includes controlling at least one of a brake system and powertrain system of the vehicle.

3. The method of claim 1, wherein:
    the predefined criteria for determining maximum allowable vehicle speed comprises a jackknife angle.

4. The method of claim 2, wherein:
    the vehicle defines a front wheel angle;
    the jackknife angle comprises the hitch angle at which no front wheel angle will reverse the sign of the modified trailer curvature.

5. The method of claim 2, wherein:
    the jackknife angle comprises hitch angles at which the vehicle collides with the trailer.

6. The method of claim 5, wherein:
    a value of the ratio of the trailer yaw rate and the vehicle speed is recalculated at small intervals of time to provide a current ratio of the trailer yaw rate and the vehicle speed.

7. The method of claim 6, wherein:
    a value of the ratio of the trailer yaw rate and the vehicle speed from a previous time interval is stored if the vehicle speed is below a predefined threshold vehicle speed, and wherein a value of the ratio of the trailer yaw rate and the vehicle speed from the previous time interval is replaced with a value of the current ratio of the trailer yaw rate and the vehicle speed if the vehicle speed is above the predefined threshold vehicle speed.

8. The method of claim 5, including:
    utilizing a value of the last stored ratio of the trailer yaw rate and the vehicle speed if the vehicle begins to move after stopping.

9. The method of claim 5, including:
    utilizing a low-pass filter to attenuate current ratio of the trailer yaw rate and the vehicle speed values that are greater than a predefined limit if vehicle speed is above a predefined minimum threshold speed.

10. A method of controlling a vehicle utilizing a trailer backup assist control system comprising:
    utilizing a controller to calculate a current value of a control parameter by dividing sensor-measured trailer yaw rate by a sensor-measured vehicle speed;
    utilizing a controller to cause the vehicle to reduce speed if the current value of the control parameter exceeds an allowable limit that is a function of the measured vehicle speed.

11. The method of claim 10, wherein:
    the vehicle includes at least one wheel defining a wheel angle that can be varied to steer the vehicle;
    the allowable limit comprises the maximum value the control parameter can take beyond which no wheel angle will reverse the sign of the control parameter.

12. The method of claim 10, wherein:
    the allowable limit comprises a collision jackknife condition.

13. The method of claim 10, wherein:
    measured trailer yaw rate is estimated by determining a time derivative of a measured trailer yaw angle or hitch angle.

14. A trailer backup assist control system, comprising:
    a sensor configured to provide data concerning vehicle speed in a reverse direction;
    a sensor configured to provide data concerning at least one of a trailer yaw angle and a trailer yaw rate;
    a controller that is configured to limit vehicle speed in a reverse direction by controlling at least one of a vehicle brake system and a vehicle powertrain system;
    wherein the control system determines a ratio of trailer yaw rate to vehicle speed as a control parameter, and limits vehicle speed in a reverse direction when the value of the control parameter exceeds the maximum allowable value for the vehicle speed.

15. The trailer backup assist control system of claim 14, wherein:
    the maximum allowable value of the control parameter comprises a jackknife condition or an impending jackknife condition.

16. The trailer back up assist control system of claim 15, wherein:
    the jackknife condition comprises a physical collision of a vehicle and a trailer connected to the vehicle.

17. The trailer back up assist control system of claim 15, wherein:
    the maximum allowable value of the control parameter comprises a control jackknife condition wherein no vehicle wheel angle of a steered wheel will reverse the sign of the control parameter.

18. The trailer back up assist control system of claim 14, including:
    a steering angle control that controls steering angle based, at least in part, on the control parameter.

* * * * *